(12) United States Patent
Uenishi (10) Patent No.: US 9,036,075 B2
(45) Date of Patent: May 19, 2015

(54) IMAGE PICKUP APPARATUS, METHOD FOR CONTROLLING THE SAME, AND STORAGE MEDIUM

(75) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 13/618,734

(22) Filed: Sep. 14, 2012

(65) Prior Publication Data

US 2013/0120645 A1    May 16, 2013

(30) Foreign Application Priority Data

Nov. 14, 2011  (JP) .................. 2011-249046
Dec. 21, 2011  (JP) .................. 2011-279690

(51) Int. Cl.
*H04N 5/232* (2006.01)
(52) U.S. Cl.
CPC ................. *H04N 5/23212* (2013.01)
(58) Field of Classification Search
CPC .................................... H04N 5/23112
USPC ......................................... 348/353
See application file for complete search history.

(56) References Cited

U.S. PATENT DOCUMENTS

| 4,309,098 | A  | * | 1/1982 | Shenk ................. | 396/105 |
| 5,614,951 | A  | * | 3/1997 | Lee et al. ............. | 348/356 |
| 8,237,849 | B2 | * | 8/2012 | Tanaka ................ | 348/353 |
| 8,363,155 | B2 | * | 1/2013 | Tsubusaki ........... | 348/357 |
| 2007/0177862 | A1 | * | 8/2007 | Terayama et al. .... | 396/133 |
| 2008/0002960 | A1 | * | 1/2008 | Ito et al. ............. | 396/125 |
| 2010/0085470 | A1 | * | 4/2010 | Tsubusaki ........... | 348/345 |
| 2011/0001869 | A1 | * | 1/2011 | Hamano .............. | 348/347 |

FOREIGN PATENT DOCUMENTS

| JP | 7-7650  | A | 1/1995 |
| JP | 8-29667 | A | 2/1996 |

* cited by examiner

*Primary Examiner* — James Hannett
(74) *Attorney, Agent, or Firm* — Canon USA Inc IP Division (57) ABSTRACT

An image pickup apparatus includes an imaging unit configured to sequentially acquire an imaging signal while a focus lens is moving, a generation unit configured to generate a focus signal by using the imaging signal, and a control unit configured to control movement of the focus lens. The control unit performs a first operation for driving the focus lens in one direction in a range including a first area and a second area which is farther from a peak position of the focus signal than the first area. In the first operation, the control unit sets a focusing speed to a first speed when the focus lens is in the first area. When a predetermined condition is satisfied in the first operation, the control unit sets a focusing speed to a second speed faster than the first speed when the focus lens is in the second area.

12 Claims, 9 Drawing Sheets

IMAGE PICKUP APPARATUS, METHOD FOR CONTROLLING THE SAME, AND STORAGE MEDIUM

BACKGROUND OF THE INVENTION

1. Field of the Invention

The present invention relates to an image pickup apparatus, a method for controlling the image pickup apparatus, and a storage medium. More particularly, the present invention relates to an image pickup apparatus such as a digital still camera and a video camera, a method for controlling the image pickup apparatus, and a storage medium storing a program for controlling the image pickup apparatus.

2. Description of the Related Art

As a method for focusing a camera on a subject by moving a focus lens position, conventional digital still cameras and video cameras employ an automatic focus (AF) method for automatically performing focusing operation by using focus evaluation values generated based on an image signal acquired from an image sensor such as a charge-coupled device (CCD) sensor.

The AF method includes a technique for predicting, while a focus lens is moving, a peak position based on focus evaluation values which have been acquired by a camera microcomputer, and varying the focus lens moving speed based on the predicted peak position.

Specifically, when the focus lens is in proximity to the predicted peak position, it is necessary to acquire sufficient number of focus evaluation values in proximity to the peak position to achieve high-accuracy AF, and therefore the camera microcomputer moves the focus lens at low speed. On the other hand, when the focus lens is far from the predicted peak position, the camera microcomputer moves the focus lens at high speed to achieve high-speed AF.

For example, Japanese Patent Application Laid-Open No. H7-7650 discusses a technique for calculating a ratio of focus evaluation value variation to lens position variation within a predetermined time period as an evaluation value change rate, and varies the focus lens moving speed according to whether the evaluation value change rate is increasing or decreasing.

Japanese Patent Application Laid-Open No. H8-29667 discusses a technique for predicting a peak position based on increasing focus evaluation values at three points and, when the predicted peak position is far from the focus lens position, moving the focus lens at high speed and then moving it at low speed, and re-predicting a peak position.

However, applying a configuration for determining the peak position based on the shape of focus evaluation values as described above to the AF scanning method for acquiring focus evaluation values while driving the focus lens in one direction in a set scanning range may cause a time lag between the time when the camera microcomputer determines that the focus lens is in proximity to the focus evaluation value peak position and the time when speed control is activated.

For example, when focus evaluation values become unstable as in the case of camera shake, angle fluctuation, or low illumination, it becomes difficult for the camera microcomputer to determine the peak position based on the shape of focus evaluation values. In this case, the camera microcomputer cannot determine the peak position before the focus lens comes so close to the focus evaluation value peak position.

If the shape of focus evaluation values cannot be suitably determined in this way, the camera microcomputer cannot complete the processing for reducing the focus lens moving speed until the focus lens reaches the focus evaluation value peak position of the subject, degrading the focus accuracy.

Differences in camera settings such as subject's contrast and frequency, diaphragm, and exposure cause differences in shape of focus evaluation values. Therefore, when determining the peak position based on the shape of focus evaluation values, the camera microcomputer, depending on the subject, cannot complete the reduction of the focus lens moving speed down to a speed for a sampling interval ensuring the AF accuracy until the focus lens reaches the proximity of the peak position.

The above-described Japanese Patent Application Laid-Open No. H7-7650 and Japanese Patent Application Laid-Open No. H8-29667 do not take into consideration a time lag between the time when the camera microcomputer determines the shape of focus evaluation values and the time when speed control is activated. Further, the above-described Japanese Patent Application Laid-Open No. H7-7650 and Japanese Patent Application Laid-Open No. H8-29667 do not change the method for determining the focus evaluation value peak position according to the subject and camera settings. Therefore, depending on the subject and camera settings, the camera microcomputer cannot complete speed control until the focus lens reaches the focus evaluation value peak position, degrading the focus accuracy.

SUMMARY OF THE INVENTION

An example of the present invention is directed to an image pickup apparatus and a method for controlling the image pickup apparatus capable of performing high-speed high-accuracy AF by suitably controlling focus lens moving speed based on a shape of focus evaluation values according to a subject and camera settings.

According to an aspect of the present invention, an image pickup apparatus includes: an imaging unit configured to sequentially acquire an imaging signal during movement of a focus lens; a generation unit configured to generate a focus signal by using a high frequency component of the imaging signal; and a control unit configured to control the movement of the focus lens based on the focus signal; wherein the control unit performs a first operation for driving the focus lens in one direction in a range including a first area and a second area which is farther from a peak position of the focus signal than the first area, wherein, in the first operation, the control unit sets a driving speed of the focus lens to a first speed when the focus lens is in the first area, and wherein, when a predetermined condition is satisfied in the first operation, the control unit sets a driving speed of the focus lens to a second speed faster than the first speed when the focus lens is in the second area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
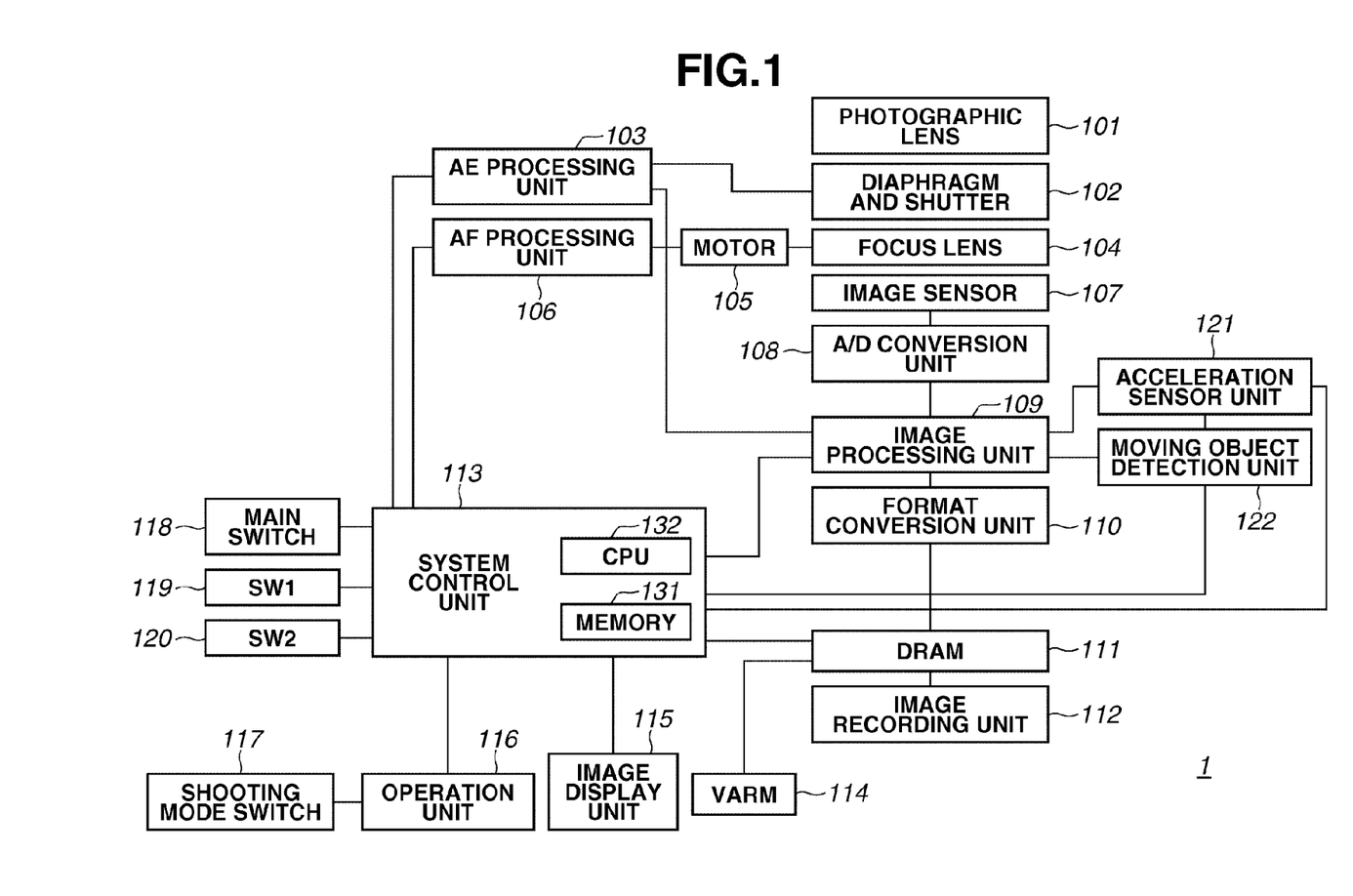
FIG. 1 is a block diagram illustrating a configuration of an image pickup apparatus according to an exemplary embodiment of the present invention.

An overall configuration of an image pickup apparatus according to an exemplary embodiment of the present invention will be described below with reference to FIG. 1. The image pickup apparatus according to an exemplary embodiment of the present invention is a digital camera 1. FIG. 1 is a block diagram illustrating a configuration of the digital camera 1 according to an exemplary embodiment of the present invention.

A photographic lens 101 is one or a plurality of lens groups including a zooming mechanism. A diaphragm and shutter 102 controls the light quantity. An automatic exposure (AE) processing unit 103 performs the AE processing based on an output of an image processing unit 109. A focus lens 104 focuses light from a subject on an image sensor 107 (described below) by moving in the optical axis direction.

A motor 105 is a driving source for driving the focus lens 104. An AF processing unit 106 performs AF processing by controlling the driving of the focus lens 104.

A light receiving unit or a photoelectric conversion unit for converting light from the subject is applied as the image sensor 107. An A/D conversion unit 108 includes a correlated double sampling (CDS) circuit for eliminating output noise of the image sensor 107 and a nonlinear amplifier circuit for signal processing before A/D conversion. The image processing unit 109 applies various image processing to an imaging signal generated by the image sensor 107 and underwent A/D conversion by the A/D conversion unit.

The image processing unit 109 generates focus evaluation values based on the imaging signal output from the A/D conversion unit 108, and outputs the focus evaluation values to the system control unit 113. Focus evaluation values, generated by using high frequency components of the imaging signal, indicate the sharpness of an image. A point at which the focus evaluation value is maximized is referred to as in-focus position.

A format conversion unit 110 converts the image output from the image processing unit 109 into a predetermined standard format. A dynamic random access memory (DRAM) 111 is a high-speed internal memory.

The DRAM 111 is used as a high speed buffer (a temporary image storage unit) or a working memory for image compression and decompression. An image recording unit 112 includes a recording medium such as a memory card, and its interface. A video RAM (VRAM) 114 is a memory for image display.

The system control unit 113 controls a system such as a shooting sequence. The system control unit 113 includes a memory 131 for storing a computer program (software) and a central processing unit (CPU) 132 for reading and executing the computer program stored in the memory 131. The memory 131 is an example of a non-transitory computer readable storage medium.

An image display unit 115 displays an image, an operation assistance screen, and camera statuses. At the time of shooting, the image display unit 115 further displays a shooting screen and a distance measurement area. An operation unit 116 is used to operate the digital camera 1 from outside.

The operation unit 116 includes a menu switch for performing various settings for shooting functions and image reproduction of the digital camera 1, a zoom lever for instructing a zooming operation of the photographic lens 101, and an operational mode changeover switch for switching modes between the shooting mode and reproduction mode. A shooting mode switch 117 is used to select a shooting mode such as the macro mode, distant view mode, and sport mode.

When a user operates the shooting mode switch 117, the system control unit 113 changes a range of distance measurement and AF operation according to the selected shooting mode.

A main switch 118 is used to turn ON the power of the system. A switch 119 (hereinafter sometimes referred to as SW1) is used to perform a shooting standby operation of AF and AE and so on. A switch 120 (hereinafter sometimes referred to as SW2) is used to start shooting after operating the SW1. An acceleration sensor unit 121 detects a motion of the digital camera 1 due to camera shake. A moving object detection unit 122 detects a moving object based on luminance information on the screen.

Operations of the digital camera 1 according to an exemplary embodiment of the present invention will be described in detail below with reference to FIGS. 2 to 8. The following processing is executed when the CPU 132 of the system control unit 113 reads a computer program (software) stored in the memory 131 of the system control unit 113.

Figure 2:
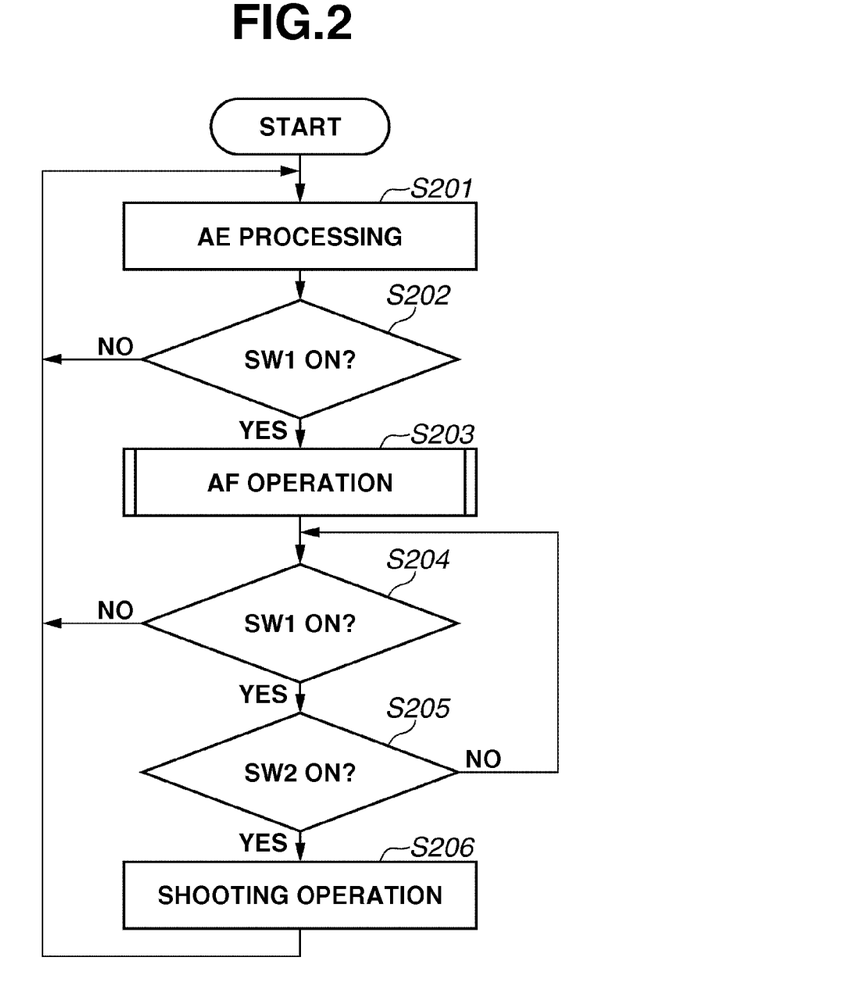
FIG. 2 is a flowchart illustrating an operation of the image pickup apparatus according to an exemplary embodiment of the present invention.

An overall operation of the digital camera 1 will be described below with reference to FIG. 2. FIG. 2 is a flowchart illustrating a series of operations of the digital camera 1.

In step S201, the AE processing unit 103 executes the AE processing by using the output of the image processing unit 109. In step S202, the system control unit 113 determines whether the state of the switch 119 (SW1) is ON. When the state of the switch 119 is ON (YES in step S202), the processing proceeds to step S203. On the other hand, when the state is OFF (NO in step S202), the processing proceeds to step S201.

In step S203, the system control unit 113 performs the AF operation described below. Exposure conditions (shutter speed, diaphragm, and sensitivity) during the AF operation are determined in the AE processing in step S201.

In step S204, the system control unit 113 determines whether the state of the switch 119 (SW1) is ON. When the state of the switch 119 is ON (YES in step S204), the processing proceeds to step S205. On the other hand, when the state is OFF (NO in step S204), the processing proceeds to step S201.

In step S205, the system control unit 113 determines whether the state of the switch 120 (SW2) is ON. When the state of the switch 120 is ON (YES in step S205), the processing proceeds to step S206. On the other hand, when the state is OFF (NO in step S205), the processing proceeds to step S204. In step S206, the system control unit 113 performs the shooting operation. Then, the processing proceeds to step S201.

Figure 3:
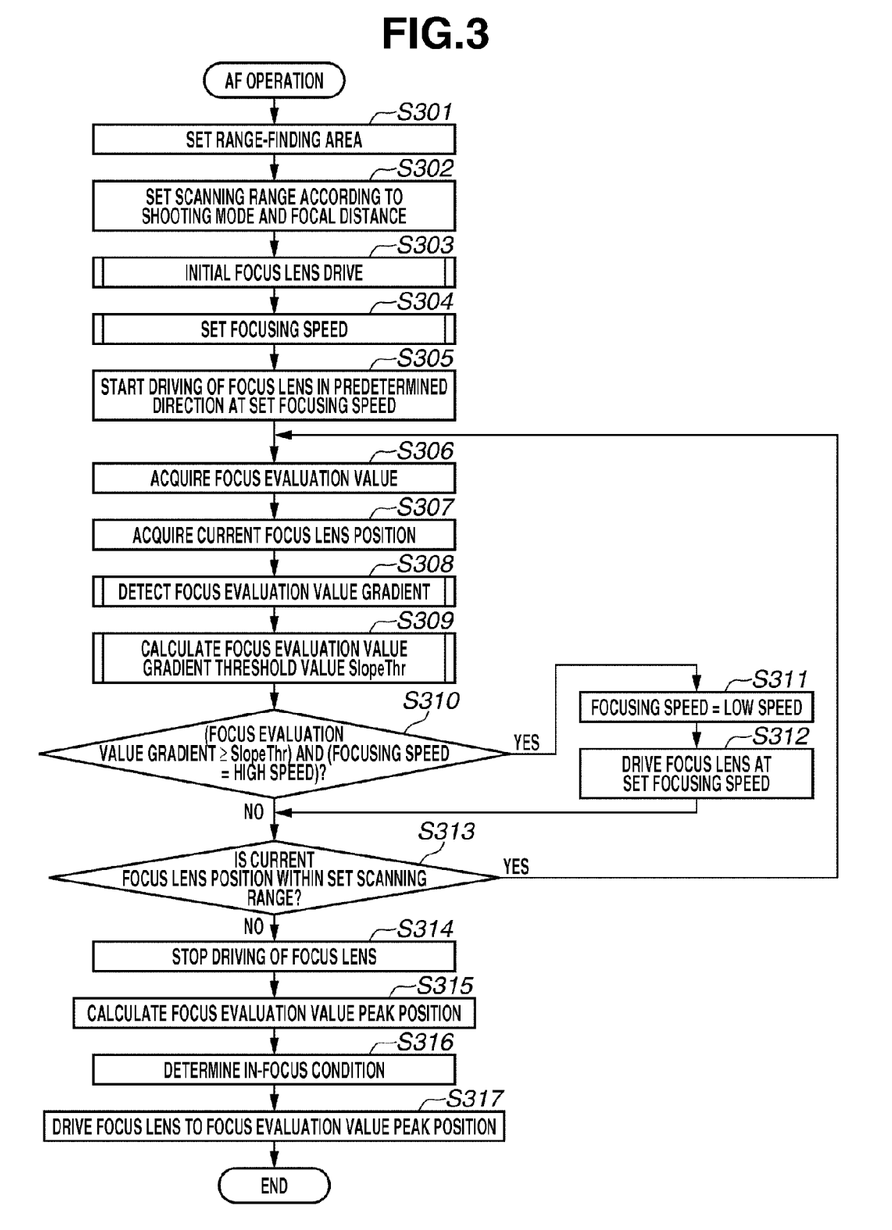
FIG. 3 is a flowchart illustrating an AF operation, performed in the processing in FIG. 2, according to an exemplary embodiment of the present invention.

The AF operation performed by the digital camera 1 in step S203 will be described below with reference to FIG. 3. FIG. 3 is a flowchart illustrating the AF operation in step S203 (see FIG. 2).

In step S301, the system control unit 113 sets a distance measurement area in a predetermined screen area. In step S302, the system control unit 113 sets a scanning range according to the shooting mode and focal distance.

In step S303, the system control unit 113 performs initial focus lens driving. In initial focus lens driving, the system control unit 113 drives the focus lens 104 via the AF processing unit 106 to move the focus lens 104 to a predetermined AF scanning start position. This initial focus lens driving will be described in detail below.

In step S304, the system control unit 113 sets the focusing speed. The focusing speed refers to the driving speed of the focus lens 104. A method for setting the focusing speed will be described below.

In step S305, the system control unit 113 starts driving the focus lens 104 in a predetermined direction at the focusing speed set in step S304. The system control unit 113 sets the "predetermined direction" to the opposite direction of the driving direction of the focus lens 104 in initial focus lens driving in step S303.

In step S306, the system control unit 113 acquires focus evaluation values in the distance measurement area set in step S301. In step S307, the system control unit 113 acquires the current position of the focus lens 104. In step S308, the system control unit 113 detects a focus evaluation value gradient based on variations in the focus lens position and focus evaluation value. A method for detecting a focus evaluation value gradient will be described below.

In step S309, the system control unit 113 calculates a focus evaluation value gradient threshold value SlopeThr. The focus evaluation value gradient threshold value SlopeThr is a threshold value used as an index for determining whether the focus lens 104 is in proximity to the in-focus position. A method for calculating the focus evaluation value gradient threshold value SlopeThr will be described below.

In step S310, the system control unit 113 determines whether the focus evaluation value gradient detected in step S308 is equal to or larger than the focus evaluation value gradient threshold value SlopeThr calculated in step S309 and whether the focusing speed is set to "HIGH SPEED".

The focusing speed determined in step S310 is set in step S304 or S311 (described below). When the detected gradient is equal to or larger than the calculated SlopeThr and when the focusing speed is set to the high speed (YES in step S310), the processing proceeds to step S311. Otherwise (NO in step S310), the processing proceeds to step S313.

In step S311, the system control unit 113 sets the focusing speed to the low speed. That is, when the system control unit 113 determines that the current position of the focus lens 104 is in proximity to the focus position, the system control unit 113 sets the focusing speed to the low speed. In step S312, the system control unit 113 drives the focus lens 104 at the focusing speed set in step S311.

Thus, when the focus lens 104 has been started to be driven at high speed when AF scanning is started, the processing in steps S310 to S312 enables reducing the moving speed of the focus lens 104 when the proximity of the focus position is determined. Then, the processing proceeds to step S313.

In step S313, the system control unit 113 determines whether the current position of the focus lens 104 acquired in step S307 is within the scanning range set in step S302. When the current position of the focus lens 104 is within the scanning range (YES in step S313), the processing proceeds to step S306. Otherwise (NO in step S313), the processing proceeds to step S314.

A series of processing in steps S306 to S313 is executed in a time period for one frame of the current frame rate. The system control unit 113 relates focus evaluation value acquired in step S306 to the lens position acquired in step S307, and uses it for calculating the focus evaluation value peak position in step S315 (described below).

The system control unit 113 drives the focus lens 104 via the AF processing unit 106 while acquiring the focus evaluation value. That is, since there is a certain amount of range for the focus lens position corresponding to the focus evaluation value, the system control unit 113 calculates the position of the focus lens 104 at a timing of the center of the exposure time, and relates the calculated position of the focus lens 104 to the focus evaluation value.

In step S314, the system control unit 113 stops driving the focus lens 104 via the AF processing unit 106. In step S315, the system control unit 113 calculates the focus evaluation value peak position by using focus evaluation values (acquired in step S306) and the positions of the focus lens 104 corresponding thereto (acquired in step S307).

In step S316, the system control unit 113 determines the in-focus condition. In step S317, the system control unit 113 drives the focus lens 104 to the focus evaluation value peak position (calculated in step S315) via the AF processing unit 106. Then, the system control unit 113 ends the AF operation.

Figure 4:
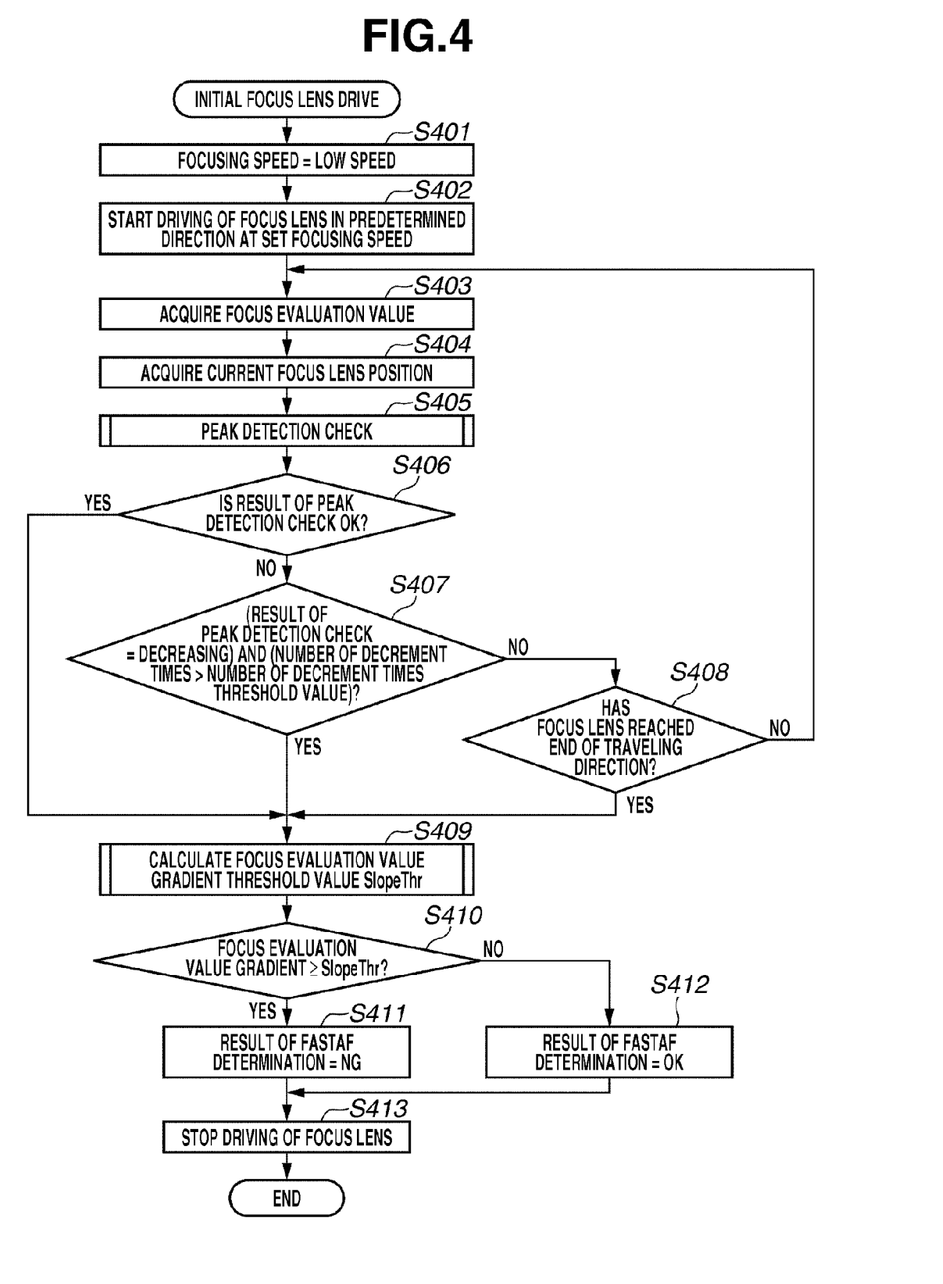
FIG. 4 is a flowchart illustrating initial focus lens driving, performed in the processing in FIG. 3, according to an exemplary embodiment of the present invention.

The initial focus lens driving in step S303 of FIG. 3 will be described below with reference to FIG. 4. FIG. 4 is a flowchart illustrating the initial focus lens driving performed in step S303 of FIG. 3.

In step S401, the system control unit 113 sets the focusing speed to the low speed. As the "LOW SPEED" in initial focus lens driving, the lowest speed at which the focus evaluation value gradient (described below) can be determined is applied.

In step S402, via the AF processing unit 106, the system control unit 113 starts driving the focus lens 104 in a predetermined direction at the focusing speed set in step S401. The "predetermined direction" is, for example, the direction in which the subject is highly likely to exist or a direction in which the current focus lens position is closer to whichever end (far or near end).

In step S403, the system control unit 113 acquires focus evaluation values within the distance measurement area set in step S301. In step S404, the system control unit 113 acquires the current position of the focus lens 104.

In step S405, the system control unit 113 performs a peak detection check. Specifically, the system control unit 113 checks whether a peak of focus evaluation values is detected. When a peak of focus evaluation values is not detected, the system control unit 113 checks whether focus evaluation values are increasing, decreasing, or remain unchanged, i.e., focus evaluation value variation. Details on the peak detection check will be described below.

In step S406, the system control unit 113 determines whether the result of the peak detection check in step S405 is "OK". When the result of the peak detection check is "OK", i.e., when a peak is detected (YES in step S406), the processing proceeds to step S409. Otherwise (NO in step S406), the processing proceeds to step S407.

In step S407, the system control unit 113 determines whether the result of the peak detection check in step S405 is "DECREASING" and the number of decrement times is larger than the number of decrement times threshold value. When the result of the peak detection check is "DECREASING" and the number of decrement times is larger than the number of decrement times threshold value (YES in step S407), the processing proceeds to step S409. Otherwise (NO in step S407), the processing proceeds to step S408.

In step S408, the system control unit 113 determines whether the current position of the focus lens 104 has reached an end of the traveling direction. When the current position of the focus lens 104 has reached the end of the traveling direction (YES in step S408), the processing proceeds to step S409. Otherwise (NO in step S408), the processing proceeds to step S403.

In step S409, the system control unit 113 calculates the focus evaluation value gradient threshold value SlopeThr. The focus evaluation value gradient threshold value SlopeThr serves as an index for determining whether the focus lens 104 is in proximity to the focus position. A method for calculating the focus evaluation value gradient threshold value SlopeThr will be described below. Then, the processing proceeds to step S410.

In step S410, the system control unit 113 determines whether the focus evaluation value gradient is equal to or larger than the focus evaluation value gradient threshold value SlopeThr calculated in step S409. The focus evaluation value gradient is value detected in focus evaluation value gradient detection in step S503 (described below). When the focus evaluation value gradient is equal to or larger than the focus evaluation value gradient threshold value SlopeThr (YES in step S410), the processing proceeds to step S411. Otherwise (NO in step S410), the processing proceeds to step S412.

In step S411, the system control unit 113 sets the result of FASTAF determination to "NG". Then, the processing proceeds to step S413. In step S412, the system control unit 113 sets the result of FASTAF determination to "OK". Then, the processing proceeds to step S413.

The result of FASTAF determination serves as an index for determining whether the focus lens 104 is started to be driven at high speed in step S305 (AF scanning operation start timing). The FASTAF determination is executed based on the focus evaluation value gradient threshold value SlopeThr, as illustrated in steps S411 and S412.

When the focus lens 104 is not in proximity to the focus position, the system control unit 113 sets the result of FASTAF determination to "OK". Otherwise, when the focus lens 104 is in close proximity to the focus position, the system control unit 113 sets the result of FASTAF determination to "NG". The result of FASTAF determination is used for focusing speed setting in step S304 (described below).

In step S413, via the AF processing unit 106, the system control unit 113 stops driving the focus lens 104. Then, the processing proceeds to step S304 in FIG. 3.

The scanning operation start position executed in step S305 of FIG. 3 and the focusing speed when starting the scanning operation are determined based on the result of the above-described initial focus lens driving. The scanning operation start position is the position at which the focus lens 104 is stopped in step S413. Therefore, when a peak is detected in the peak detection check in step S405 (described below) in the initial focus lens driving, the scanning operation is started at a position exceeding the peak.

The focusing speed at the start of the scanning operation is determined based on the result of FASTAF determination performed in step S411 or S412 in focusing speed setting (described below).

Figures 5, 5A:
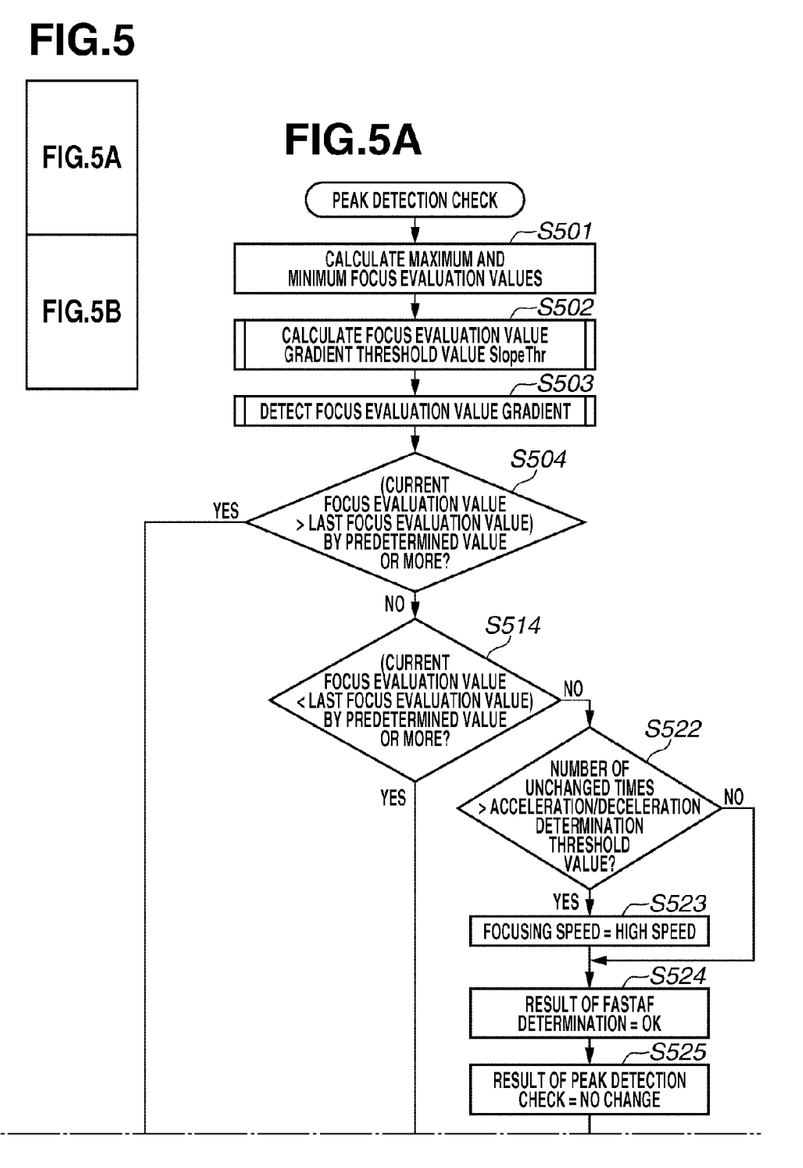
FIG. 5 (5A+5B) is a flowchart illustrating a peak detection check, performed in the processing in FIG. 4, according to an exemplary embodiment of the present invention.
Figure 5B:
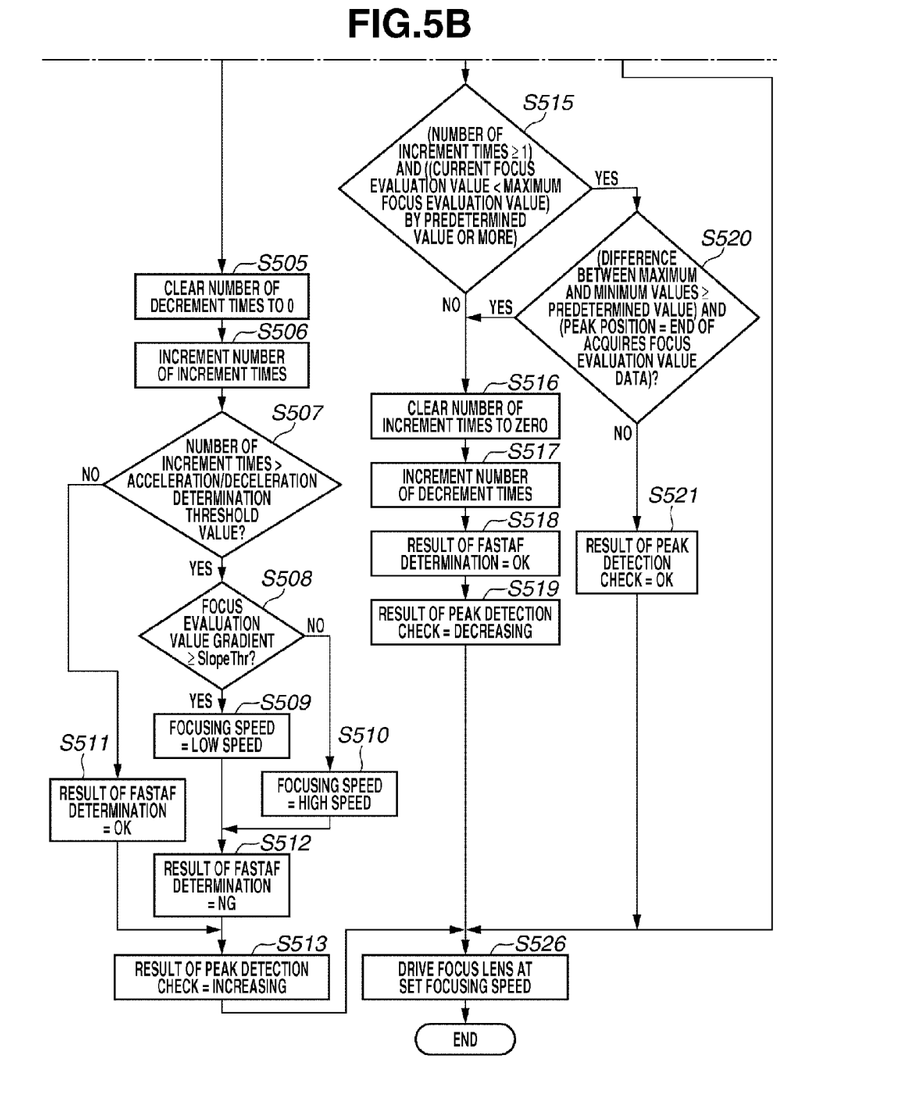

The peak detection check in step S405 of FIG. 4 will be described below with reference to FIG. 5 (5A+5B). FIG. 5 is a flowchart illustrating the peak detection check in step S405 of FIG. 4.

In step S501, the system control unit 113 calculates maximum and minimum focus evaluation values which have been acquired in step S403, and stores the maximum and minimum values in the memory 131. In step S502, the system control unit 113 calculates the focus evaluation value gradient threshold value SlopeThr by using a method described below. In step S503, the system control unit 113 detects the focus evaluation value gradient by using a method described below.

In step S504, the system control unit 113 determines whether the currently acquired focus evaluation value is larger than the previously acquired focus evaluation value by a predetermined value or more. When the currently acquired focus evaluation value is larger than the previously acquired focus evaluation value by the predetermined value or more (YES in step S504), the processing proceeds to step S505. Otherwise (NO in step S504), the processing proceeds to step S514.

In step S505, the system control unit 113 clears the number of decrement times to zero. In step S506, the system control unit 113 increments the number of increment times which is the number of times the currently acquired focus evaluation value is determined to be larger than the last acquired focus evaluation value.

In step S507, the system control unit 113 determines whether the number of increment times is larger than an acceleration/deceleration determination threshold value. The acceleration/deceleration determination threshold value is used as an index for determining whether the focusing speed is to be set to "HIGH SPEED".

In the peak detection check, since the direction of the subject focus position is to be determined at as early a stage as possible, the acceleration/deceleration determination threshold value is to be determined by the lowest number of times (for example, two) by which the direction of the subject focus position can be determined. When the number of increment times is larger than the acceleration/deceleration determination threshold value (YES in step S507), the processing proceeds to step S508. Otherwise (NO in step S507), the processing proceeds to step S511.

In step S508, the system control unit 113 determines whether the focus evaluation value gradient is equal to or larger than the focus evaluation value gradient threshold value SlopeThr calculated in step S502. When the focus evaluation value gradient is equal to or larger than the focus evaluation value gradient threshold value SlopeThr (YES in step S508), the processing proceeds to step S509. Otherwise (NO in step S508), the processing proceeds to step S510.

In step S509, the system control unit 113 sets the focusing speed to "LOW SPEED". Then, the processing proceeds to step S512. In step S510, the system control unit 113 sets the focusing speed to "HIGH SPEED". Then, the processing proceeds to step S512. In step S512, the system control unit 113 sets the result of FASTAF determination to "NG". Then, the processing proceeds to step S513.

In step S511, the system control unit 113 sets the result of FASTAF determination to "OK". Then, the processing proceeds to step S513.

In step S513, the system control unit 113 sets the result of peak detection check to "INCREASING". Then, the processing proceeds to step S526.

In step S514 (in a case of "NO" in step S504), the system control unit 113 determines whether the current focus evaluation value is smaller than the last focus evaluation value by a predetermined value or more. When the current focus evaluation value is smaller than the last focus evaluation value by the predetermined value or more (YES in step S514), the processing proceeds to step S515. Otherwise (NO in step S514), the processing proceeds to step S522.

In step S515, the system control unit 113 checks the following three conditions (1) to (3).
(1) Is the number of increment times one or more?
(2) Is the current focus evaluation value smaller than the maximum focus evaluation value stored in step S501 by a predetermined value or more?
(3) Is the difference between the maximum and minimum values stored in step S501 a predetermined value or more?

When all of the conditions (1) to (3) are satisfied (YES in step S515), the processing proceeds to step S520. Otherwise (NO in step S515), the processing proceeds to step S516. In step S520, the system control unit 113 determines whether the peak position is an end of focus evaluation value data which have been acquired so far. When the peak position is an end of focus evaluation value data (YES in step S520), the processing proceeds to step S516. Otherwise (NO in step S520), the processing proceeds to step S521.

In step S516, the system control unit 113 clears the number of increment times to zero. In step S517, the system control unit 113 increments the number of decrement times. In step S518, the system control unit 113 sets the result of FASTAF determination to "OK". In step S519, the system control unit 113 sets the result of peak detection check to "DECREASING". Then, the processing proceeds to step S526.

In step S521, the system control unit 113 sets the result of peak detection check to "OK". That is, when all of the conditions (1) to (3) are satisfied (YES in step S515) and the peak position is not an end of focus evaluation value data (NO in step S520), the system control unit 113 determines that a peak of focus evaluation values is detected. Then, the processing proceeds to step S526.

In step S522 (in a case of "NO" in step S514), the system control unit 113 determines whether the number of unchanged times (focus evaluation values neither increase nor decrease, i.e., remain unchanged) is larger than the acceleration/deceleration determination threshold value. When the number of unchanged times is larger than the acceleration/deceleration determination threshold value (YES in step S522), the processing proceeds to step S523. Otherwise (NO in step S522), the processing proceeds to step S524.

In step S523, the system control unit 113 sets the focusing speed to "HIGH SPEED". In step S524, the system control unit 113 sets the result of FASTAF determination to "OK". In step S525, the system control unit 113 sets the result of peak detection check to "NO CHANGE". Then, the processing proceeds to step S526.

In step S526, via the AF processing unit 106, the system control unit 113 drives the focus lens 104 at a set focusing speed. Then, the processing proceeds to step S406 in FIG. 4.

With the above-described processing, the system control unit 113 can determine whether the focus lens 104 is in proximity to the focus position based on a state of focus evaluation value variation (i.e., the shape of focus evaluation values) until the focus lens 104 is driven to the AF scanning start position.

During the focus lens driving operation, the system control unit 113 drives the focus lens 104 at high speed when the focus lens 104 is far from the focus position, and at low speed when the focus lens 104 is in proximity to the focus position. Thus, the focus lens driving time can be reduced.

Figure 6:
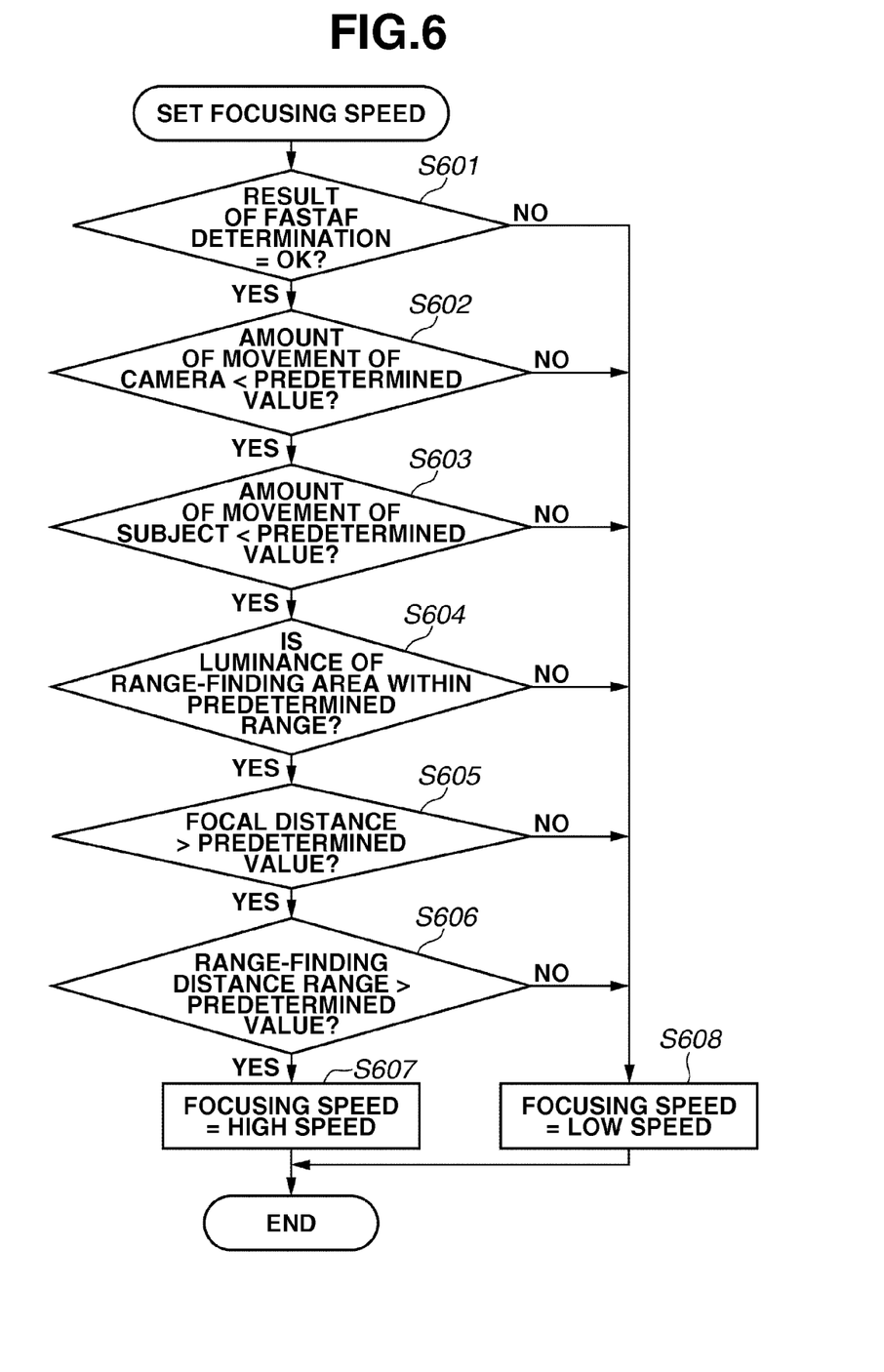
FIG. 6 is a flowchart illustrating a focusing speed setting, performed in the processing in FIG. 3, according to an exemplary embodiment of the present invention.

Focusing speed setting in step S304 (see FIG. 3) will be described below with reference to FIG. 6. FIG. 6 is a flowchart illustrating focusing speed setting in step S304 of FIG. 3.

In step S601, the system control unit 113 determines whether the result of FASTAF determination is "OK". When the result is "OK" (YES in step S601), the processing proceeds to step S602. Otherwise (NO in step S601), the processing proceeds to step S608.

In step S602, the system control unit 113 determines whether the amount of movement of the digital camera 1 detected by the acceleration sensor unit 121 is smaller than a predetermined value. When the amount of movement of the digital camera 1 is smaller than the predetermined value (YES in step S602), the processing proceeds to step S603. Otherwise (NO in step S602), the processing proceeds to step S608. Thus, in focus evaluation value gradient detection in steps S308 and S502 (described below), it is possible to reduce the influence of mis-detection resulting from focus evaluation value variation due to camera shake.

In step S603, the system control unit 113 determines whether the amount of movement of the subject (viewing angle variation) detected by the moving object detection unit 122 is smaller than a predetermined value. When the amount of movement of the subject is smaller than the predetermined value (YES in step S603), the processing proceeds to step S604. Otherwise (NO in step S603), the processing proceeds to step S608.

In step S604, the system control unit 113 determines whether the luminance in the distance measurement area is within a predetermined range. When the luminance in the distance measurement area is within the predetermined range (YES in step S604), the processing proceeds to step S605. Otherwise (NO in step S604), the processing proceeds to step S608.

In step S605, the system control unit 113 determines whether the focal distance is longer than a predetermined value in the current camera settings. When the focal distance is longer than the predetermined value (YES in step S605), the processing proceeds to step S606. Otherwise (NO in step S605), the processing proceeds to step S608.

In step S606, the system control unit 113 determines whether the range of distance measurement is longer than a predetermined value (i.e., depth of focus is equal to or larger than a predetermined value) in the current camera settings. When the range of distance measurement is longer than the predetermined value (YES in step S606), the processing proceeds to step S607. Otherwise (NO in step S606), the processing proceeds to step S608.

In step S607, the system control unit 113 sets the focusing speed to "HIGH SPEED". Then, the processing proceeds to step S305 in FIG. 3. In step S608, the system control unit 113 sets the focusing speed to "LOW SPEED". Then, the processing proceeds to step S305 in FIG. 3.

Referring to FIG. 6, as described above, the focusing speed is set to the high speed when the result of FASTAF determination is "OK" and the predetermined shooting conditions are satisfied. Although, in FIG. 6, the predetermined shooting conditions are the conditions in steps S602 to S606, the predetermined shooting conditions may be a part of the conditions in steps S602 to S606.

Figure 7:
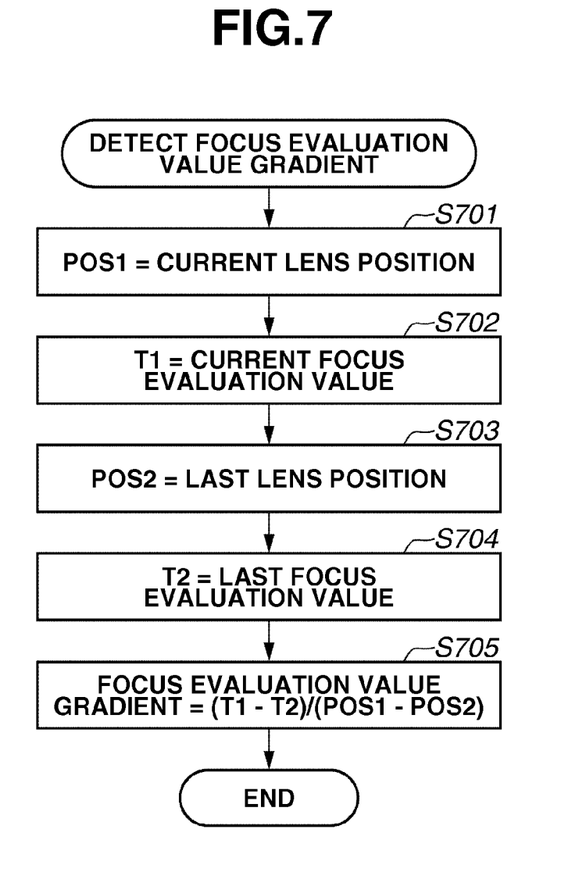
FIG. 7 is a flowchart illustrating a focus evaluation value gradient detection, performed in the processing in FIGS. 3 and 5, according to an exemplary embodiment of the present invention.

Focus evaluation value gradient detection in steps S308 and S503 will be described below with reference to FIG. 7. FIG. 7 is a flowchart illustrating focus evaluation value gradient detection in step S308 of FIG. 3 and step S503 of FIG. 5.

In step S701, the system control unit 113 set as "Pos1" the current lens position acquired in step S307 or S404. In step S702, the system control unit 113 set as "T1" the current focus evaluation value acquired in step S306 or S403. In step S703, the system control unit 113 set as "Pos2" the last lens position acquired in step S307 or S404. In step S704, the system control unit 113 set as "T2" the last focus evaluation value acquired in step S306 or S403. In step S705, the system control unit 113 calculates the focus evaluation value gradient. The focus evaluation value gradient can be calculated by using the following formula:

$$(\text{Focus evaluation value gradient}) = (T1-T2)/(Pos1-Pos2)$$

Then, the processing proceeds to step S309 in FIG. 3 or step S504 in FIG. 5.

Figure 8:
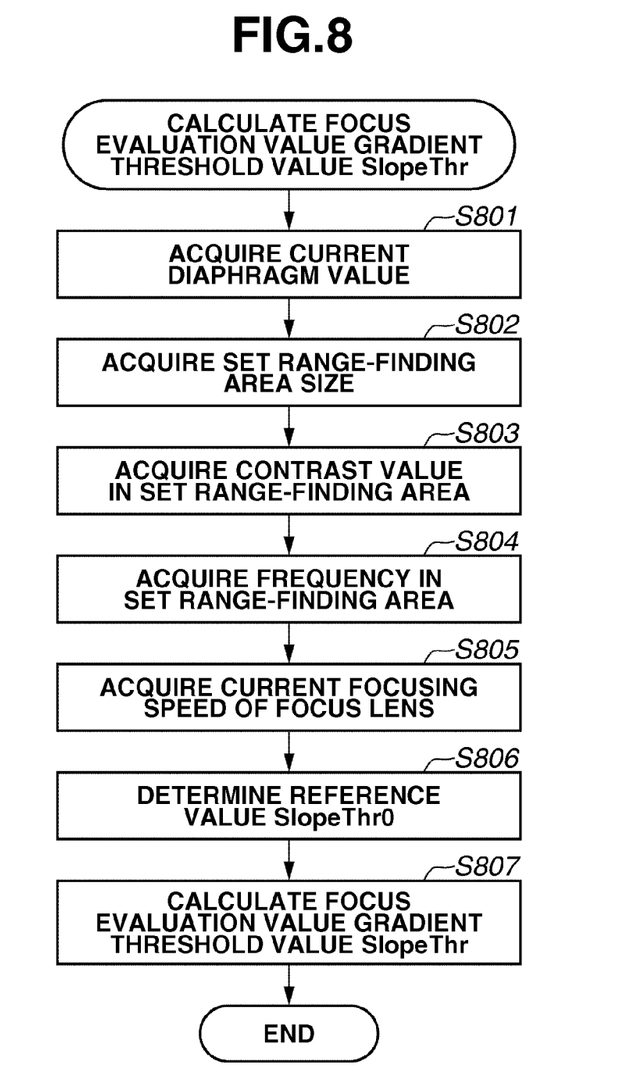
FIG. 8 is a flowchart illustrating a focus evaluation value gradient threshold value SlopeThr calculation, performed in the processing in FIGS. 3, 4, and 5, according to an exemplary embodiment of the present invention.

Focus evaluation value gradient threshold value SlopeThr calculation in step S309 in FIG. 3, step S409 in FIG. 4, and step S502 in FIG. 5 will be described below with reference to FIG. 8. FIG. 8 is a flowchart illustrating the focus evaluation value gradient threshold value SlopeThr calculation in step S309 in FIG. 3, step S409 in FIG. 4, and step S502 in FIG. 5.

In step S801, the system control unit 113 determines the current status of the diaphragm and shutter 102 and acquires the current diaphragm value. In step S802, the system control unit 113 acquires the size of the distance measurement area set in step S301.

In step S803, the system control unit 113 acquires a contrast value in the distance measurement area set in step S301. The "contrast value in the distance measurement area" is a difference between the maximum and minimum luminance values in the distance measurement area set in step S301. This contrast value enables grasping the contrast of the subject in the distance measurement area to some extent even if the subject is out of focus.

In step S804, the system control unit 113 acquires the frequency in the distance measurement area set in step S301. In an embodiment of the present invention, the frequency in the distance measurement area refers to spatial frequency components of the imaging signal in the distance measurement area. Then, the processing proceeds to step S805. Various known methods can be applied to acquire the frequency in the distance measurement area, so that detailed descriptions will be omitted. In step S805, the system control unit 113 acquires the current focusing speed of the focus lens 104.

In step S806, the system control unit 113 determines a reference value SlopeThr0. In calculating the focus evaluation value gradient threshold value SlopeThr in step S807 (described below), the reference value SlopeThr0 is the basis of the focus evaluation value gradient threshold value SlopeThr. The reference value SlopeThr0 is determined by a reference subject and the settings of the digital camera 1.

A method for determining the reference value SlopeThr0 may be changed depending on application. For example, in initial focus lens driving in step S303 of FIG. 3, it is necessary to reduce the focusing speed at a position where the focus lens 104 crosses over the focus evaluation value peak position so that the focus evaluation value peak position is included in the scanning range at the time of subsequent AF scanning operation. In other words, in the initial focus lens driving, it is enough to detect the existence of the focus evaluation value peak position.

At the time of the AF scanning operation, on the other hand, it is necessary to more finely acquire focus evaluation values in proximity to the peak position to ensure the required AF accuracy. Therefore, the focus lens speed should be reduced before the focus lens 104 crosses over the focus evaluation value peak position. Therefore, the system control unit 113 changes the reference value SlopeThr0 in step S409 or S502 (during initial focus lens driving before AF scanning) and in step S309 (during AF scanning operation).

Specifically, the system control unit 113 sets the value of the reference value SlopeThr0 during the initial focus lens driving larger than that during AF scanning operation. Therefore, the focus evaluation value gradient threshold value SlopeThr during the initial focus lens driving becomes larger than that during AF scanning operation.

In initial focus lens driving, the above-described configuration enables promptly moving the focus lens 104 to the scanning start position. In AF scanning operation, the above-described configuration enables reliably reducing the focusing speed before the focus lens 104 crosses over the focus evaluation value peak position, achieving high-accuracy AF.

In step S807, the system control unit 113 calculates the focus evaluation value gradient threshold value SlopeThr. The focus evaluation value gradient threshold value SlopeThr is calculated, for example, by using the following formula:

$$\text{SlopeThr} = \text{SlopeThr0} \times MMP \times \text{WinSize} \times \text{Freq} \times (1/\text{Speed}) \times (1/F\text{Num})$$

where FNum is a coefficient determined based on the diaphragm value, MMP is a coefficient determined based on the contrast in the distance measurement area, Freq is a coefficient determined based on the frequency in the distance measurement area, WinSize is a coefficient determined by the distance measurement area size, and Speed is a coefficient determined based on the focusing speed.

A method for determining the above-described SlopeThr0 and each coefficient will be described below. First of all, the system control unit 113 temporarily determines an F value (FNum0), a subject's contrast value (MMP0), a subject's frequency (Freq0), a distance measurement area size (WinSize0), and a focusing speed (Speed0) as shooting conditions. Based on the shape of focus evaluation values for the shooting conditions, the system control unit 113 sets as SlopeThr0 the focus evaluation value peak gradient at a timing for reducing the focusing speed.

FNum is a coefficient determined based on the diaphragm value. When the diaphragm value changes, the depth of focus changes and accordingly the focus evaluation value peak gradient changes. Therefore, the system control unit 113 uses FNum as a coefficient for changing SlopeThr according to the diaphragm value. When the diaphragm value increases, the depth of focus increases and accordingly the gradient decreases. Therefore, FNum is calculated by using the following formula:

$$F\text{Num} = F\text{Num0}/\text{Current } F \text{ value}$$

MMP is a coefficient determined based on the contrast in the distance measurement area. When the contrast value increases, the focus evaluation value peak gradient also increases. Therefore, MMP is calculated by using the following formula:

$$MMP = \text{Current contrast value of subject}/MMP0$$

Freq is a coefficient determined based on the frequency in the distance measurement area. When the subject's frequency increases, the focus evaluation value peak gradient also increases. Therefore, Freq is calculated by using the following formula:

$$Freq = Current\ subject's\ frequency / Freq0$$

WinSize is a coefficient determined based on the distance measurement area size. When the distance measurement area size increases, the focus evaluation value peak gradient also increases because of increased amount of signal. Therefore, WinSize is calculated by using the following formula:

$$WinSize = Current\ WiSize / WinSize0$$

"Speed" is a coefficient determined based on the focusing speed. When "Speed" increases, the focus evaluation value peak gradient also increases. Therefore, "Speed" is calculated by using the following formula:

$$Speed = Current\ focusing\ speed / Speed0$$

Although, in this formula, the focus evaluation value gradient threshold value SlopeThr is calculated by using all of the above-described coefficients to the reference value SlopeThr0, SlopeThr may be calculated by using at least one of these coefficients. With this calculation method, the focus evaluation value gradient threshold value SlopeThr is determined based on at least one of the subject's contrast value, the subject's frequency, the distance measurement area size, the diaphragm state, and the focusing speed.

Thus, even when the shape of focus evaluation values changes depending on the subject and camera settings, the system control unit 113 can suitably determine the subject peak position. Then, the processing proceeds to step S310 in FIG. 3, step S410 in FIG. 4, or step S503 in FIG. 5.

Although, in the present exemplary embodiment, the system control unit 113 adjusts the focus lens speed by using two values (low speed or high-speed) by determining whether the focus evaluation value gradient is larger than a predetermined threshold value, the processing is not limited thereto. The focusing speed may be finely varied according to the focus evaluation value gradient.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-249046 filed Nov. 14, 2011 and No. 2011-279690 filed Dec. 21, 2011, which are hereby incorporated by reference herein in their entirety.

What is claimed is:

1. An image pickup apparatus comprising:
   an imaging unit configured to sequentially acquire an imaging signal while a focus lens is moving;
   a generation unit configured to generate a focus signal by using a high frequency component of the imaging signal; and
   a control unit configured to control movement of the focus lens based on the focus signal;
   wherein the control unit performs a first operation for driving the focus lens in one direction in a range including a first area and a second area which is farther from a peak position of the focus signal than the first area,
   wherein, in the first operation, the control unit sets a driving speed of the focus lens to a first speed when the focus lens is in the first area,
   wherein, when a predetermined condition is satisfied in the first operation, the control unit sets a driving speed of the focus lens to a second speed faster than the first speed when the focus lens is in the second area, and
   wherein, when a gradient of the focus signal with respect to a position of the focus lens exceeds a first predetermined value while driving the focus lens at the second speed, the control unit changes the driving speed of the focus lens to the first speed.

2. An image pickup apparatus according to claim 1, wherein the predetermined condition is that a range of distance measurement is longer than a predetermined value.

3. An image pickup apparatus according to claim 1, wherein the predetermined condition is that an amount of movement of the image pickup apparatus is smaller than a predetermined value.

4. An image pickup apparatus according to claim 1, wherein the predetermined condition is that an amount of movement of a subject is smaller than a predetermined value.

5. An image pickup apparatus according to claim 1, wherein the predetermined condition is that a luminance value is within a predetermined range.

6. An image pickup apparatus according to claim 1, wherein the predetermined condition is that a focal distance value is longer than a predetermined value.

7. An image pickup apparatus according to claim 1, wherein the first predetermined value is changed according to at least one of a diaphragm value, a subject's contrast value, a subject's frequency, a size of an area for acquiring the focus signal, and a driving speed of the focus lens.

8. An image pickup apparatus according to claim 1, wherein, before the first operation, the control unit performs a second operation for driving the focus lens in reverse direction of the first operation, and
   wherein, based on the focus signal acquired in the second operation, the control unit sets a moving speed of the focus lens when starting the first operation.

9. An image pickup apparatus according to claim 8, wherein the predetermined condition is that a gradient of the focus signal with respect to a position of the focus lens acquired at an end of the second operation is smaller than a second predetermined value.

10. An image pickup apparatus according to claim 1, wherein, before the first operation, the control unit performs a second operation for driving the focus lens in reverse direction of the first operation,
   wherein, based on the focus signal acquired in the second operation, the control unit sets a moving speed of the focus lens when starting the first operation, and
   wherein the first predetermined value in the first operation is smaller than the first predetermined value in the second operation.

11. A control method of an image pickup apparatus comprising steps of:

sequentially acquiring an imaging signal while a focus lens is moving;

generating a focus signal by using a high frequency component of the imaging signal; and controlling movement of the focus lens based on the focus signal, wherein, in the controlling step, a first operation is performed for driving the focus lens in one direction in a range including a first area and a second area which is farther from a peak position of the focus signal than the first area, wherein, in the first operation, in the controlling step, a driving speed of the focus lens when the focus lens is in the first area is set to a first speed, wherein, when a predetermined condition is satisfied in the first operation, in the controlling step, a driving speed of the focus lens when the focus lens is in the second area is set to a second speed faster than the first speed, and wherein, when a gradient of the focus signal with respect to a position of the focus lens exceeds a first predetermined value while driving the focus lens at the second speed, in the controlling step, the driving speed of the focus lens is changed to the first speed.

12. A non-transitory computer readable storage medium storing a program for controlling an image pickup apparatus, wherein the program executes a process via a computer, the process including:

sequentially acquiring an imaging signal while a focus lens is moving;

generating a focus signal by using a high frequency component of the imaging signal; and controlling movement of the focus lens based on the focus signal, wherein, in the controlling step, a first operation is performed for driving the focus lens in one direction in a range including a first area and a second area which is farther from a peak position of the focus signal than the first area, wherein, in the first operation, in the controlling step, a driving speed of the focus lens when the focus lens is in the first area is set to a first speed, wherein, when a predetermined condition is satisfied in the first operation, in the controlling step, a driving speed of the focus lens when the focus lens is in the second area is set to a second speed faster than the first speed, and wherein, when a gradient of the focus signal with respect to a position of the focus lens exceeds a first predetermined value while driving the focus lens at the second speed, in the controlling step, the driving speed of the focus lens is changed to the first speed.

* * * * *